US012745769B2

(12) United States Patent
Kirkwood et al.

(10) Patent No.: US 12,745,769 B2
(45) Date of Patent: Sep. 29, 2026

(54) ANTIMICROBIAL COMPOSITION COMPRISING A POLYIMIDE

(71) Applicant: The Procter & Gamble Company, Cincinnati, OH (US)

(72) Inventors: Kathleen Kirkwood, Newcastle (GB); Eva Maria Perez-Prat Vinuesa, Vinhedo (BR); Ana L. Morales Garcia, Newcastle upon Tyne (GB); Graeme Andrew Williamson, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 446 days.

(21) Appl. No.: 18/213,920

(22) Filed: Jun. 26, 2023

(65) Prior Publication Data

US 2023/0413813 A1 Dec. 28, 2023

(30) Foreign Application Priority Data

Jun. 27, 2022 (EP) .................................... 22181216

(51) Int. Cl.

*A01N 33/12* (2006.01)
*A01N 25/02* (2006.01)
*A01N 25/24* (2006.01)
*A01N 25/30* (2006.01)

(52) U.S. Cl.

CPC ............. *A01N 33/12* (2013.01); *A01N 25/02* (2013.01); *A01N 25/24* (2013.01); *A01N 25/30* (2013.01)

(58) Field of Classification Search

CPC ............ A01N 33/12; A01N 25/30; A01P 1/00
See application file for complete search history.

(56) References Cited

U.S. PATENT DOCUMENTS

| | | | | |
|---|---|---|---|---|
| 2003/0007939 | A1* | 1/2003 | Murad ................. | C11D 3/2086 424/61 |
| 2011/0229430 | A1* | 9/2011 | Hawkins ................ | A61K 8/899 424/70.13 |
| 2016/0262382 | A1 | 9/2016 | Lan et al. | |
| 2019/0159998 | A1* | 5/2019 | Hartwich ............. | A61K 8/8182 |
| 2022/0401322 | A1* | 12/2022 | Stella ....................... | A61Q 5/02 |

FOREIGN PATENT DOCUMENTS

| | | | |
|---|---|---|---|
| EP | 0303774 | A2 | 2/1989 |
| EP | 3766953 | A1 | 1/2021 |
| WO | 2008157323 | A1 | 12/2008 |

OTHER PUBLICATIONS

Anonymous; Database GNPD Mintel, "ThickeningShampoo with Ginger Extract", XP055981691, Database accession No. 9049188, dated Sep. 30, 2021, 2 Pages.
PCT Search Report and Written Opinion for PCT/US2023/068693 dated Sep. 29, 2023, 14 pages.
Extended EP Search Report and Opinion for 22181216.7 dated Nov. 24, 2022, 8 Pages.

* cited by examiner

*Primary Examiner* — Andrew S Rosenthal
(74) *Attorney, Agent, or Firm* — Gary J. Foose

(57) ABSTRACT

An aqueous antimicrobial cleaning composition having a biocidal agent and a polyimide.

15 Claims, No Drawings

ANTIMICROBIAL COMPOSITION COMPRISING A POLYIMIDE

FIELD OF THE INVENTION

The present invention is in the field of antimicrobial compositions, in particular the field of antimicrobial cleaning compositions. The composition provides long-lasting biocidal properties.

BACKGROUND OF THE INVENTION

Although compositions such as those described in EP3766953A1 provide long lasting sanitization benefits to hard non-porous surfaces, there is still a need for antimicrobial cleaning compositions that are stable, provide cleaning and long-lasting sanitization and provide good shine and lack of stickiness on the treated surface.

SUMMARY OF THE INVENTION

According to the first aspect of the present invention, there is provided an antimicrobial cleaning composition. The composition provides long-lasting (i.e., residual) antimicrobial properties. The composition is stable on storage. The composition provides good cleaning and imparts good shine to the treated surface. The composition does not leave the treated surface streaky or tacky.

According to the second aspect of the invention there is provided a method of treating a surface with the composition of the invention to provide residual biocidal properties to the surface.

According to the third aspect of the invention there is provided the use of the composition of the invention to provide residual biocidal properties to an inanimate surface, preferably to a non-porous hard surface.

The elements of the composition of the invention described in relation to the first aspect of the invention apply mutatis mutandis to the other aspects of the invention.

DETAILED DESCRIPTION OF THE INVENTION

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mould, mildew and algae. Viral particles and other infectious agents are also included in the term microbe.

"Antimicrobial" further should be understood to encompass both microbicidal and microbiostatic properties. That is, the term comprehends microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad-spectrum activity (e.g. against bacteria, viruses and fungi). When speaking of efficacy against a particular microorganism or taxonomic rank, the more focused term will be used (e.g. antifungal to denote efficacy against fungal growth in particular). Using the above example, it should be understood that efficacy against fungi does not in any way preclude the possibility that the same antimicrobial composition may demonstrate efficacy against another class of microbes.

Residual biocidal properties refer to achieving at least 99.9% microbial reduction in the Environmental Protection Agency (EPA)-approved 24 hour Residual Self Sanitizing (RSS) test methodology for dried product residues on hard, non-porous surfaces (EPA #01-1A). That is, the compositions of the invention displaying residual biocidal properties are able to deliver at least 99.9% microbial reduction after a 12-abrasion and 5-reinoculation 24 hour testing regime.

Antimicrobial Composition

The present invention is directed to an antimicrobial composition. The composition comprises:

i) a biocidal agent selected from the group consisting of quaternary ammonium compounds, chlorohexidine salts, polymeric biguanides, tertiary alkyl amines and mixtures thereof; and
ii) a polyimide.

The composition can further comprise a surfactant, a pH adjusting agent and/or a fragrance, among other components. The composition is an aqueous solution, preferably the composition comprises more than 80%, more preferably more than 85% and especially from 86 to 98.5% by weight of the composition of water.

The composition is formulated to provide antimicrobial and residual biocidal properties for at least 24 hours, via delivering at least 99.9% microbial reduction in the EPA-approved 24 hour RSS test method (EPA #01-1A) The composition can be applied to a surface by spraying, rolling, fogging, wiping or other means. Preferably, the composition is applied to the surface and left to dry. The composition acts as a surface sanitizer, killing infectious microbes present on the surface for at least 24 hours.

Once dried, the liquid formulation leaves a residual protective film on the surface. The residual film possesses a biocidal property, enabling it to maintain protection of the surface against microbial contamination for an extended time period after its application.

The antimicrobial composition imparts a film with the capacity to quickly kill bacteria and other germs for at least 24 hours after deposition of the film on the treated surface. Quick kill generally refers to a time period of about 30 seconds to about 5 minutes. The film will remain on the surface and is durable to multiple touches and wearing of the surface. After the composition is applied to a surface the surface presents a good shine profile.

Biocidal Agent

The biocidal agent needs only be present in germicidally effective amounts, which can be as little as 0.01% by weight of the composition. Preferably, the composition of the invention comprises the biocidal agent at an active level of from 0.02% to 2.50%, more preferably from 0.05% to 1.6%, still more preferably from 0.1% to 1.2%, and most preferably from 0.20% to 1.0% by weight of the composition. A germicidally effective amount of the biocidal agent can be considered to result in at least a log 3.0 reduction of bacteria, fungi or viruses using the US EPA Germicidal Spray Test or EPA wipe method (protocol #01-1A) with a contact time in the range of 30 seconds to 10 minutes, more preferably 30 seconds to 5 minutes.

Quaternary Ammonium Biocidal Compound

Preferred quaternary ammonium compound (QAC) includes QAC with the following molecular structure:

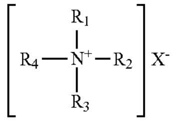

wherein:

R1, R-2, R3, and R4 are independently selected and include, but are not limited to, alkyl, alkoxy, or aryl, either with or without heteroatoms, or saturated or non-saturated. Some or all of the functional groups may be the same.

The corresponding anion X" includes, but is not limited to, a halogen, sulfonate, sulfate, phosphonate, phosphate, carbonate/bicarbonate, hydroxy, or carboxylate.

QACs include, but are not limited to, n-alkyl dimethyl benzyl ammonium chloride, di-n-octyl dimethyl ammonium chloride, dodecyl dimethyl ammonium chloride, di-n-decyl dimethyl ammonium chloride, N-octyl decyl dimethyl ammonium chloride, n-alkyl dimethyl benzyl ammonium saccharinate, and 3-(trimethoxysilyl) propyldimethyloctadecyl ammonium chloride.

Combinations of monomeric QACs are preferred to be used for the composition of the invention. A specific example of QAC combination is N-alkyl dimethyl benzyl ammonium chloride (40%); N-octyl decyl dimethyl ammonium chloride (30%); di-n-decyl dimethyl ammonium chloride (15%); and di-n-octyl dimethyl ammonium chloride (15%). The percentage is the weight percentage of individual QAC based on the total weight of blended QACs composition. Examples of commercially available quaternary ammonium compounds include, but are not limited to, Bardac 205M and 208M from Lonza, and BTC885 from Stepan Company. The composition comprises from about 0.05% to about 2%, preferably from 0.10% to 1% by weight of the composition of QAC.

Chlorohexidine Salt

Chlorhexidine salts include chlorhexidine digluconate, chlorhexidine dihydrochloride, chlorhexidine bis-bicarbonate, chlorhexidine carbonate or chlorhexidine diacetate. Chlorhexidine diacetate is especially preferred for use herein. Chlorhexidine diacetate has relatively low solubility in water (i.e., ~1% in water) and is slow to solubilize, which makes it an ideal for residual sanitizer applications. It is also cidally effective at low concentrations. Additionally, since chlorhexidine diacetate is a salt, it has little or no effect on the filming or streaking profile of the inventive composition. In one embodiment, chlorhexidine diacetate is used as the only antimicrobial active in the composition; in another embodiment, it is present as one of multiple registered actives in the composition.

Polymeric Biguanide

The polymeric biguanide may comprise polyhexamethylene biguanide (PHMB), polyhexamethylene monoguanide (PHMG), polyethylene biguanide (PEB), polytetramethylene biguanide (PTMB), polyhexamethylene biguanide (PHMB), polymethylene biguanide (PMB), poly(allylbiguanidinio-co-allyamine, poly(N-vinyl-biguanide), polyallylbiguanide etc. Preferred polymeric biguanide for use herein is a polyalkylene biguanide, more preferably polyhexamethylene biguanide hydrochloride with an average of repeating biguanide units between 10 and 50 or from 10 to 25. Such polyhexamethylene biguanide is supplied as a 20% solution in water and sold for multiple applications by Lonza under variants of the tradename Vantocil (e.g., Vantocil IB, Vantocil P, etc.) as well as under the tradename Reputex.

Tertiary Alkyl Amine

Tertiary alkyl amines suitable for use herein include alkyl amines having from about 8 to about 16 carbon atoms. Examples of amine biocides that may be used in the composition include N, N-bis(3-aminopropyl) dodecylamine, N-(3-aminopropyl)-N-dodecylpropane-1,3-diamine, N-(3-aminopropyl)-N-decyl-1,3-propanediamsne, N-(3-aminopropyi)-N-tetradecyl-1,3-propanediamine, N-lauryldiethanolamine or mixtures thereof.

Polyimide

The composition comprises from about 0.1% to about 4%, preferably from about 0.5% to about 2% by weight of the composition of a polyimide. More preferably from about 0.6% to about 1.5% by weight of the composition of a polyimide. A polyimide is a polymer of imide monomers. The composition of the invention comprises at least one polyimide. The polyimide comprises at least one structural unit (A1), at least one structural unit (A2), at least one structural unit (A3), and optionally one additional structural unit (A4)

(A1)

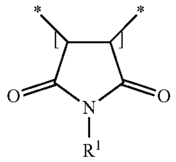

(A2)

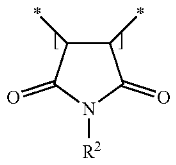

(A3)

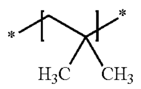

(A4)

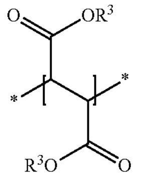

wherein $R^1$ stands for an optionally heterofunctionalized alkyl radical;

$R^2$ stands for an optionally heterofunctionalized alkyl radical other than $R^1$; and $R^3$, independently of one another, stands for H, or an optionally heterofunctionalized alkyl radical other than $R^1$ and $R^2$.

The polymers may be random, block, or alternating, or combinations thereof.

Without wishing to be bound by theory, it may be possible that the structural units (A3) which derived from isobutylene are arranged in alternating manner with other structural units (A1), (A2) and optionally (A4). In this situation, every structural unit (A3) is always connected to structural units selected from (A1), (A2) and optionally (A4), and any structural unit (A3) cannot directly connect with another structural unit (A3). As such, the polymer is a "alternating" polymer. It may be preferred that the polyimide polymer of this invention comprises more than 30%-by weight of the polymer with such "alternating" feature, preferable more than 50%, more preferably more than 70%, and most preferably more than 90% by weight of the polymer.

Preferably, the polyimide comprises at least one structural unit (A1), at least one structural unit (A2), at least one structural unit (A3), and at least one structure unit (A4)|

(A1)

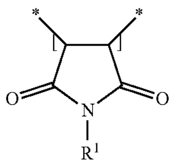

(A2)

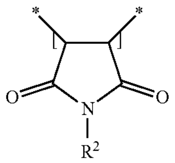

(A3)

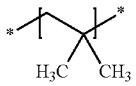

(A4)

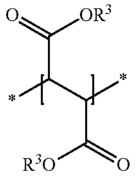

It has proved to be advantageous when:

- $R^1$ in the structural unit (A1) stands for a radical —$CH(CH_3)CH_2$—$(OCH(CH_3)CH_2)_x$—$(OCH_2CH_2)_y$—O—$CH_3$, in which x and y, independently of one another, have a value between 1 and about 100 and/or
- $R^2$ in the structural unit (A2) stands for a radical containing an amino group, preferably for a radical having a tertiary amine, and/or
- $R^3$ in the structural unit (A4), independently of one another, stands for H, or an alkyl radical, preferably a (C1 to (4) alkyl radical.

Particularly preferred polyimides include at least about 70% by weight, preferably at least about 80% by weight, preferably at least 90% by weight and in particular at least about 95% by weight of the structural units (A1), (A2), (A3) and (A4). Further preferred polyimides are formed entirely of the structural units (A1), (A2), (A3) and (A4).

Some preferred polyimides are listed below. These polyimides include at least about 70% by weight, preferably at least about 80% by weight, preferably at least about 90% by weight and in particular at least about 95% by weight, most preferably entirely of the structural units (A1), (A2), (A3) and (A4):

A-I) Polyimides Having at Least One Structural Unit A1), at Least One Structural Unit (A2), at Least One Structural Unit (A3) and at Least One Structural Unit (A4).

wherein

- $R^1$ in structural unit (A1) stands for a radical —$CH_1(CH_3)CH_2$—$(OCH(CH_3)CH_2)_x$—$(OCH_2CH_2)_y$—O—$CH_3$, in which x and y, independently of one another, have a value between 1 and about 100 and/or
- $R^2$ in structural unit (A2) stands for a radical —$(CH_2)_3$—$N(CH_3)_2$,
- $R^3$ in structural unit (A4), independently of one another, stands for an optionally heterofunctionalized alkyl radical other than $R^1$ and $R^2$.

A-II) Polyimides Having at Least One Structural Unit (A1), at Least One Structural Unit (A2), at Least One Structural Unit (A3) and at Least One Structural Unit (A4).

wherein

- $R^1$ in structural unit (A1) stands for a radical —$CH(CH_3)CH_2$—$(OCH(CH_3)CH_2)_x$—$(O)CH_2CH_2)_y$—O—$CH_3$, in which x and y, independently of one another, have a value between 1 and about 100 and/or
- $R^2$ in structural unit (A2) stands for an optionally heterofunctionalized alkyl radical other than RU; and
- $R^3$ in structural unit (A4) stands for —$CH_2CH_3$ or —$CH_2CH_2CH_3$, preferably for —$CH_2CH_3$ and a radical $R^3$ is H.

A-III) Polyimides Having at Least One Structural Unit (A1), at Least One Structural Unit (A2) at Least One Structural Unit A3) and at Least One Structural Unit (A4).

wherein

- $R^1$ in structural unit (A1) stands for an optionally heterofunctionalized alkyl radical;
- $R^2$ in structural unit (A2) stands for a radical —$(CH_2)_3$—$N(CH_3)_2$; and
- $R^3$ in structural unit (A3) stands for —$CH_2CH_3$ or —$CH_2CH_2$—$CH_3$ preferably for —$CH_2CH_3$ and a radical $R^3$ is H.

Very particularly preferred polyimides are exemplified in that

- $R^1$ in structural unit (A1) stands for a radical —$CH(CH_3)CH_2$—$(OCH(CH_3)CH_2)_x$—$(OCH_2CH_2)_y$—O—$CH_3$, in which x and y, independently of one another, have a value between 1 and about 100;
- $R^2$ in structural unit (A2) stands for a radical —$(CH_2)_3$—$N(CH_3)_2$;
- $R^3$ in structural unit (A4) stands for —$CH_2CH_3$ and a radical $R^3$ stands for H.

Suitable polyimides are available, for example, from Ashland under the trade names Aquaflex™ XL 30 (INCI: isobutylene/dimethylaminopropyl maleimide/ethoxylated maleimide/maleic acid copolymer or Polyimide-1, with CAS number: 497926-97-3).

As another preferred embodiment, the polyimide comprises at least one structural unit (A1), at least one structural unit (A2), at least one structural unit (A3).

(A1)

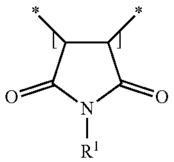

-continued (A2)

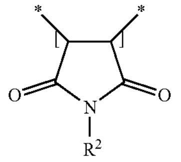

(A3)

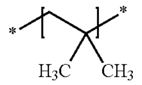

It has proved to be advantageous when:

$R^1$ in the structural unit (A1) stands for alkyl radical, preferably a (C1 to C4) alkyl radical $R^2$ in the structural unit (A2) stands for optionally heterofunctionalized alkyl radical, preferably a (C1 to C4) alkyl radical other than Rr;

Very particularly preferred polyimides are exemplified in that $R^1$ in structure unit (A1) stands for a radical $—CH_2CH_3$;

$R^2$ in structure unit (A2) stands for a radical $—CH_2CH_2—OH$;

Suitable polyimides are available, for example, from Ashland under the trade names Aquaflex™ FX64 (copolymer of isobutylene, ethylmaleimide, and hydroxyethylmaleimide, with CAS number: 283148-39-0).

Surfactant

The composition of the invention comprises from 0.05 to 5%, preferably from 0.05 to 4% by weight of the composition of surfactant. The surfactant may contribute to cleaning and spreading of the composition on the surface to be cleaned.

Non-Ionic Surfactants

The composition of the invention preferably comprises from 0.05 to 5%, more preferably from 0.05 to 4% by weight of the composition of non-ionic surfactant. Preferably the non-ionic surfactant is selected from the group consisting of amine oxide surfactants, alcohol alkoxylated surfactants, alkyl polyglucoside surfactants and mixtures thereof.

Alcohol Alkoxylate Non-Ionic Surfactants

Suitable alcohol alkoxylate non-ionic surfactants are according to the formula RO-(A)nH, wherein: R is a primary C4 to C18, preferably a C6 to C16, more preferably a C6 to C14 branched or linear alkyl chain, or a C6 to C28 alkyl benzene chain; A is an ethoxy or propoxy or butoxy unit, or mixtures thereof, and wherein n is from 1 to 30, preferably from 1 to 15, more preferably from 3 to 12 even more preferably from 3 to 8. Preferred R chains for use herein are the C6 to C16 linear or branched alkyl chains.

Suitable branched alkoxylated alcohol may be selected from the group consisting of C4-C10 alkyl branched alkoxylated alcohols, and mixtures thereof. The branched alkoxylated alcohol can be derived from the alkoxylation of C4-C10 alkyl branched alcohols selected form the group consisting of C4-C10 primary mono-alcohols having one or more C1-C4 branching groups.

By C4-C10 primary mono-alcohol, it is meant that the main chain of the primary mono-alcohol has a total of from 4 to 10 carbon atoms. The C4-C10 primary mono-alcohol can be selected from the group consisting of: methyl butanol, ethyl butanol, methyl pentanol, ethyl pentanol, methyl hexanol, ethyl hexanol, propyl hexanol, dimethyl hexanol, trimethyl hexanol, methyl heptanol, ethyl heptanol, propyl heptanol, dimethyl heptanol, trimethyl heptanol, methyl octanol, ethyl octanol, propyl octanol, butyl octanol, dimethyl octanol, trimethyl octanol, methyl nonanol, ethyl nonanol, propyl nonanol, butyl nonanol, dimethyl nonanol, trimethyl nonanol and mixtures thereof.

The C4-C10 primary mono-alcohol can be selected from the group consisting of: ethyl hexanol, propyl hexanol, ethyl heptanol, propyl heptanol, ethyl octanol, propyl octanol, butyl octanol, ethyl nonanol, propyl nonanol, butyl nonanol, and mixtures thereof.

Preferably the C4-C10 primary mono-alcohol is selected from the group consisting of: ethyl hexanol, propyl hexanol, ethyl heptanol, propyl heptanol, and mixtures thereof.

The C4-C10 primary mono-alcohol is most preferably ethyl hexanol, and propyl heptanol. In the branched alkoxylated alcohol, the one or more C1-C4 branching group can be substituted into the C4-C10 primary mono-alcohol at a C1 to C3 position, preferably at the C1 to C2 position, more preferably at the C2 position, as measured from the hydroxyl group of the starting alcohol. The branched alkoxylated alcohol can comprise from 1 to 14, preferably from 2 to 7, more preferably from 4 to 6 ethoxylate units, and optionally from 1 to 9, preferably from 2 to 7, more preferably from 4 to 6 of propoxylate units.

The branched alkoxylated alcohol is preferably 2-ethyl hexan-1-ol ethoxylated to a degree of from 4 to 6, and propoxylated to a degree of from 4 to 6, more preferably, the alcohol is first propoxylated and then ethoxylated. Another preferred branched alkoxylated alcohols are 2-alkyl-1-alkanols such as alkoxylate C10 guerbet alcohols with 1 to 14, preferably from 2 to 7, more preferably from 3 to 6 ethoxylate or ethoxylate-propoxylate units.

Non-limiting examples of suitable branched alkoxylated alcohols are, for instance, Ecosurf® EH3, EH6, and EH9, commercially available from DOW, and Lutensol® XP alkoxylate Guerbet alcohols & Lutensol® XL ethoxylated Guerbet alcohols available from BASF.

Linear alcohol alkoxylate non-ionic surfactants preferred herein are alkoxylated non-ionic surfactants with a C8, C10, C12, mixtures of C8 to C10, mixtures of C10 to C12, mixtures of C9 to C11 linear alkyl chain and 8 or less ethoxylate units, preferably 3 to 8 ethoxylate units.

Non-limiting examples of suitable linear alkoxylated non-ionic surfactants for use herein are Dobanol® 91-2.5 (R is a mixture of C9 and C11 alkyl chains, n is 2.5), Dobanol® 91-5 (R is a mixture of C9 to C11 alkyl chains, n is 5); Dobanol® 91-10 (R is a mixture of C9 to C11 alkyl chains, n is 10); Greenbentine DE60 (R is a C10 linear alkyl chain, n is 6); Marlipal 10-8 (R is a C10 linear alkyl chain, n is 8); Neodol 91-8 (R is a mixture of C9 to C11 alkyl chains, n is 8); Empilan® KBE21 (R is a mixture of C12 and C14 alkyl chains, n is 21); Lutensol ON30 (R is C10 linear alkyl chain, n is 3); Lutensol ON50 (R is C10 linear alkyl chain, n is 5); Lutensol ON70 (R is C10 linear alkyl chain, n is 7); Novel 610-3.5 (R is mixture of C6 to C10 linear alkyl chains, n is 3.5); Novel 810FD-5 (R is mixture of C8 to C10 linear alkyl chains, n is 5); Novel 10-4 (R is C10 linear alkyl chain, n is 4); Novel 1412-3 (R is mixture of C12 to C14 linear alkyl chains, n is 3); Lialethl® 11-5 (R is a C11 linear alkyl chain, n is 5); Lialethl® 11-21 (R is a mixture of linear and branched C11 alkyl chain, n is 21), or mixtures thereof.

The alkoxylated non-ionic surfactant may be a secondary alcohol ethoxylate such as for example the Tergitol™-15-S surfactants having the general formula shown below and commercially available by DOW

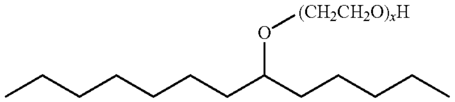

Alkyl carbon chain length = 11 to 5, X = 3 to 40

Tergitol 15-S Surfactants

Preferred secondary alcohol ethoxylate surfactants have 3-9 EO units.

Another suitable alkoxylate non-ionic surfactant is an alkyl ethoxy alkoxy alcohol, preferably wherein the alkoxy part of the molecule is propoxy, or butoxy, or propoxy-butoxy. More preferred alkyl ethoxy alkoxy alcohols are of formula (II):

Formula (II)

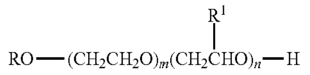

wherein:

R is a branched or unbranched alkyl radical having 8 to 16 carbon atoms;

$R^1$ is a branched or unbranched alkyl radical having 1 to 5 carbon atoms;

n is from 1 to 10; and m is from 6 to 35.

R is preferably from 12 to 15, preferably 13 carbon atoms. $R^1$ is preferably a branched alkyl radical having from 1 to 2 carbon atoms. n is preferably 1 to 5. m is preferably from 8 to 25. Preferably, the weight average molecular weight of the ethoxylated alkoxylated non-ionic surfactant of formula (II) is from 500 to 2000 g/mol, more preferably from 600 to 1700 g/mol, most preferably 800 to 1500 g/mol.

The ethoxylated alkoxylated non-ionic surfactant can be a polyoxyalkylene copolymer. The polyoxyalkylene copolymer can be a block-heteric ethoxylated alkoxylate non-ionic surfactant, though block-block surfactants are preferred. Suitable polyoxyalkylene block copolymers include ethylene oxide/propylene oxide block polymers, of formula (III):

$(EO)x(PO)y(EO)x$, or $(PO)x(EO)y(PO)x$ wherein:

EO represents an ethylene oxide unit, PO represents a propylene oxide unit, and x and y are numbers detailing the average number of moles ethylene oxide and propylene oxide in each mole of product. Such materials tend to have higher molecular weights than most non-ionic surfactants, and as such can range between 1000 and 30000 g/mol, although the molecular weight should be above 2200 and preferably below 13000 to be in accordance with the invention. A preferred range for the molecular weight of the polymeric non-ionic surfactant is from 2400 to 11500 Daltons. BASF (Mount Olive, N.J.) manufactures a suitable set of derivatives and markets them under the Pluronic trademarks. Examples of these are Pluronic (trademark) F77, L62 and F88 which have the molecular weight of 6600, 2450 and 11400 g/mol respectively.

Other suitable ethoxylated alkoxylate non-ionic surfactants are described in Chapter 7 of Surfactant Science and Technology, Third Edition, Wiley Press, ISBN 978-0-471-68024-6.

Most preferably the alkoxylated non-ionic surfactant is selected from the group consisting of: 2-propylheptyl EO8 (Lutensol XL89-BASF); 2-propylheptyl EO5 (Lutensol XL50-BASF); C10 alcohol EO5 (Lutensol ON 50-BASF); C10-alcohol EO7 (Lutensol ON 70-BASF); C8-C10 EO5 (Novel 810 FD5 Sasol); C10 EO4 (Novel 10-4 Sasol); Tergitol 15-S-3; Tergitol 15-S-5; Tergitol 15-S-7; and Ethyl hexanol PO5EO6 (Ecosurf EH6-Dow).

Alkyl Polyglucoside non-ionic surfactants Alkyl polyglycosides are biodegradable non-ionic surfactants which are well known in the art, and can be used in the compositions of the present invention. Suitable alkyl polyglycosides can have the general formula $C_nH_{2n+1}O(C_6H_{10}O_5)xH$ wherein n is preferably from 6 to 16, more preferably 8 to 14, and x is at least 1. Examples of suitable alkyl polyglucoside surfactants are the TRITON™ alkyl polyglucosides from Dow; Agnique PG, Disponil APG and Glucopon alkyl polyglucosides from BASF. Preferred alkyl polyglucoside surfactants are those where n is 8 to 12, more preferably 8 to 10, such as for example Triton CG50 (Dow).

Alkyl Glucamide Non-Ionic Surfactants

The composition of the invention may comprise an alkyl glucamide surfactant. Glucamide surfactants are non-ionic surfactants in which the hydrophilic moiety (an amino-sugar derivative) and the hydrophobic moiety (a fatty acid) are linked via amide bonds. This results in a chemical linkage, which is highly stable under alkaline conditions. Particularly preferred alkyl glucamide surfactants are N-alkyl-N-acyl-glucamides of the formula (I):

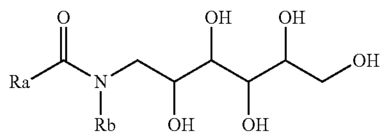

(I)

wherein:

Ra is a linear or branched, saturated or unsaturated hydrocarbyl group having 6 to 22 carbon atoms, and Rb is a C1-C4 alkyl radical. Particularly preferably, Rb in formula (I) is a methyl radical. Non-limiting examples of these glucamide surfactants are: N-octanoyl-N-methylglucamide, N-nonanoyl-N-methylglucamide, N-decanoyl-N-methylglucamide, N-dodecanoyl-N-methylglucamide, N-cocoyl-N-methylglucamide, available under the trade name of GlucoPure Foam from Clariant, N-lauroyl/myristoyl-N-methylglucamide, (available under the trade name of GlucoPure Deg from Clariant, and N-octanoyl/decanoyl-N-methylglucamide, available under the trade name of GlucoPure Wet by Clariant.

Amine Oxide Surfactants

The composition of the invention preferably comprises from 0.05 to 5%, more preferably from 0.1 to 2% and more preferably from 0.2 to 1% by weight of the composition of amine oxide surfactant.

Suitable amine oxide surfactants include: R1R2R3NO wherein each of R1, R2 and R3 is independently a saturated or unsaturated, substituted or unsubstituted, linear or branched hydrocarbon chain having from 1 to 30 carbon atoms. Preferred amine oxide surfactants are amine oxides having the following formula: R1R2R3NO wherein R1 is a hydrocarbon chain comprising from 1 to 30 carbon atoms, preferably from 6 to 20, more preferably from 8 to 16 and wherein R2 and R3 are independently saturated or unsaturated, substituted or unsubstituted, linear or branched hydrocarbon chains comprising from 1 to 4 carbon atoms, preferably from 1 to 3 carbon atoms, and more preferably are methyl groups. R1 may be a saturated or unsaturated, substituted or unsubstituted linear or branched hydrocarbon chain.

Highly preferred amine oxides are C8 dimethyl amine oxide, C10 dimethyl amine oxide, C12 dimethyl amine oxide, C14 dimethyl amine oxide, and mixtures thereof. C8 dimethyl amine oxide is commercially available under the trade name Genaminox® OC from Clariant; C10 dimethyl amine oxide is commercially available under the trade name Genaminox® K-10 from Clariant; C12 dimethyl amine oxide is commercially available under the trade name Genaminox® LA from Clariant; C14 amine oxide is commercially available under the trade name of Empigen OH 25 from Huntsman. Other suitable amine oxide surfactants are cocoyldiethoxy amine oxide available under the trade name of Genaminox CHE from Clariant, and cocamydopropyl amine oxide commercially available under the trade name of Empigen OS/A from Huntsman. Particularly preferred amine oxide surfactants are C10 dimethyl amine oxide such as Genaminox K-10, C12 dimethyl amine oxide, C14 dimethyl amine oxide and mixtures thereof. Amine oxide surfactants provide good cleaning properties and good shine.

Zwitterionic and Amphoteric Surfactants

The cleaning composition may comprise an amphoteric surfactant, a zwitterionic surfactant, and mixtures thereof. Suitable zwitterionic surfactants typically contain both cationic and anionic groups in substantially equivalent proportions so as to be electrically neutral at the pH of use, and are well known in the art. Some common examples of zwitterionic surfactants are described in U.S. Pat. Nos. 2,082,275, 2,702,279 and 2,255,082.

Suitable zwitteronic surfactants include betaines such alkyl betaines, alkylamidobetaine, amidazoliniumbetaine, sulfobetaine (INCI Sultaines) as well as the phosphobetaine.

Suitable betaines are the alkyl betaines of the formula (Ia), the alkyl amido betaine of the formula (Ib), the sulfo betaines of the formula (Ic) and the amido sulfobetaine of the formula (Id);

R1-N+(CH3)2-CH2COO— (Ia)

R1-CO—NH(CH2)3-N+(CH3)2-CH2COO— (Ib)

R1-N+(CH3)2-CH2CH(OH)CH2SO3- (Ic)

R1-CO—NH—(CH2)3-N+(CH3)2-CH2CH(OH)CH2SO3- (Id)

in which R1 is a saturated or unsaturated C6-C22 alkyl residue, preferably C8-C18 alkyl residue. Particularly preferred are betaines of the formula Ia such as for example N-alkyl-N-dimethyl betaine like the one sold under the trade name of Empigen BB by Huntsman.

Examples of suitable betaines and sulfobetaine are the following designated in accordance with [INCI]: Almondamidopropyl of betaines, Apricotamidopropyl betaines, Avocadamidopropyl of betaines, Babassuamidopropyl of betaines, Behenamidopropyl betaines, Behenyl of betaines, betaines, Canolamidopropyl betaines, Capryl/Capramidopropyl betaines, Camitine, Cetyl of betaines, Cocamidoethyl of betaines, Cocamidopropyl betaines, Cocamidopropyl Hydroxysultaine, Coco betaines, Coco Hydroxysultaine, Coco/Oleamidopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucamidopropyl Hydroxysultaine, Hydrogenated Tallow of betaines, Isostearam idopropyl betaines, Lauramidopropyl betaines, Lauryl of betaines, Lauryl Hydroxysultaine, Lauryl Sultaine, Milkamidopropyl betaines, Minkamidopropyl of betaines, Myristamidopropyl betaines, Myristyl of betaines, Oleamidopropyl betaines, Oleamidopropyl Hydroxysultaine, Oleyl of betaines, Olivamidopropyl of betaines, Palmam idopropyl betaines, Palm itam idopropyl betaines, Palmitoyl Carnitine, Palm Kemelamidopropyl betaines, Polytetrafluoroethylene Acetoxypropyl of betaines, Ricinoleamidopropyl betaines, Sesam idopropyl betaines, Soyamidopropyl betaines, Stearamidopropyl betaines, Stearyl of betaines, Tallowamidopropyl betaines, Tallowamidopropyl Hydroxysultaine, Tallow of betaines, Tallow Dihydroxyethyl of betaines, Undecylenamidopropyl betaines and Wheat Germamidopropyl betaines.

If the composition comprises a zwitterionic surfactant, it is preferably a betaine of the formula Ia such as for example N-alkyl-N-dimethyl betaine like the one sold under the trade name of Empigen BB by Huntsman.alkyl dimethyl betaine.

Amphoteric surfactants can be either cationic or anionic depending upon the pH of the composition. Suitable amphoteric surfactants include dodecylbeta-alanine, N-alkyltaurines such as the one prepared by reacting dodecylamine with sodium isethionate, as taught in U.S. Pat. No. 2,658,072, N-higher alkylaspartic acids such as those taught in U.S. Pat. No. 2,438,091. Other suitable amphoteric surfactants are the products sold under the trade name Miranol by Solvay-Novecare such as, for example, sodium lauroamphoacetate (Miranol Ultra L-32E), sodium stearoampho acetate (Miranol DM), disodium cocoamphodiacetate (Miranol C2m Conc NP), disodium lauroamphodiacetate (Miranol BM Conc), disodium capryloampho dipropionate (Miranol JBS), sodium mixed C8 amphocarboxylate (Miranol JEM Conc), and sodium capryloampho hydroxypropyl sulfonate (Miranol JS). Other non-limiting examples of suitable amphoteric surfactants are disodium capryloamphodiacetate (Mackam 2CY 75-Solvay Novecare), octyliminodipropionate (Ampholak YJH40-Akzo Nobel), sodium lauriminodipropionate (Mirataine H2C-HA-Solvay Novecare), and sodium lauroamphohydroxypropylsulfonate (Mackam LS-Solvay Novecare).

Other suitable additional surfactants can be found in McCutcheon's Detergents and Emulsifers, North American Ed. 1980.

Alkyl Pyrrolidone Surfactants:

Pyrrolidone-based surfactants, including alkyl pyrrolidones, are well known and their use and methods of making them have been extensively reviewed (for instance in Pyrrolidone-based surfactants (a literature review), Login, R. B. J Am Oil Chem Soc (1995) 72: 759-771).

Suitable alkyl pyrrolidones can have the formula:

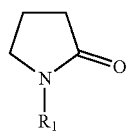

wherein:

R1 is C6-C20 alkyl, or R2NHCOR3, and R2 is C1-C6 alkyl and R3 is C6-C20 alkyl. R1 is preferably C6-C20 alkyl. Suitable alkylpyrrolidones include N-alkyl-2-pyrrolidones, wherein the alkyl chain is C6 to C20, or C6 to C10, or C8.

Suitable alkyl pyrrolidones are marketed under the tradename Surfadone® by the Ashland Inc., such as Surfadone LP-100 (N-octly-2-pyrrolidone) and LP-300 (N-docedycl-2-pyrrolidone) and is also available from BASF.

Particularly preferred surfactants for use herein include non-ionic surfactants, in particular branched alcohol alkoxylates, more in particular 2-ethyl hexan-1-ol ethoxylated to a degree of from 4 to 6, and propoxylated to a degree of from 4 to 6, more preferably, the alcohol is first propoxylated and then ethoxylated, and 2-alkyl-1-alkanols such as alkoxylate C10 guerbet alcohols with 1 to 14, preferably 2 to 8, more preferably 3 to 6 ethoxylate or ethoxylate-propoxylate units. Other particularly preferred non-ionic surfactants include linear alcohol alkoxylate non-ionic surfactants with C8, C10, C12, mixtures of C8 to C10, mixtures of C10 to C12, mixtures of C9 to C11 linear alkyl chain and 8 or less ethoxylate units, preferably 3 to 8 ethoxylate units.

Other particularly preferred surfactants for use here in include linear amine oxide surfactants, in particular C8, C10, C12, C14dimethyl amine oxide surfactants and mixtures thereof. Other particularly preferred surfactants are alkylpolyglucoside surfactants, more in particular C8 to C12 alkyl polyglucosides, more preferably C8 to C10 alkyl polyglucosides such as for example Triton CG50 (Dow).

pH Adjusting Agents

Depending on the targeted uses, a composition of the present invention for home care use may need appropriate pH conditions. For example, if the composition is used in the kitchen area, a high pH product may be desired in order to effectively remove grease soils commonly found in the area. If the composition is used in a bathroom area, soap scum and hard water deposits may be the primary concern. In such cases, a low pH product may be more appropriate. There is no limitation on the types of pH adjusting agents that can be added into the liquid composition of the present invention. Example of pH adjusting agents that can be used include, but are not limited to, triethanolamine, diethanolamine, monoethanolamine, sodium hydroxide, sodium carbonate, ammonium hydroxide, potassium hydroxide, potassium carbonate, calcium carbonate, citric acid, acetic acid, hydrochloric acid, sulfamic acid, sulfuric acid and the like. Preferably, alkaline compositions comprise from 0.1 to 2% of alkanol amine, more preferably monoethanolamine. Preferably, acid compositions comprise from 0.1 to 5% of an organic acid, preferably citric acid. Ammonium hydroxide is also preferred. It provides good shine.

Other than components mentioned above, additional functional components may be included in the composition of the present invention. Additional components include, but are not limited to, chelants, compatibilizers, coupling agents, corrosion inhibitors, rheology modifiers, fragrances, colorants, preservatives, UV stabilizers, solvents, and active ingredient indicators.

Preferred compositions herein include compositions comprising:

i) from about 0.2% to about 2.5% by weight of the biocidal agent;

ii) from about 0.2% to about 1.5% by weight of the composition of the polyimide;

iii) from about 0.05% to about 2% by weight of the composition of a surfactant preferably selected from the group consisting of an amine oxide surfactant, a non-ionic alcohol alkoxylate surfactant, an alkyl polyglucoside surfactant and mixtures thereof, preferably the composition comprises an amine oxide surfactant;

iv) from about 0.2% to about 3% by weight of the composition of a pH adjusting agent, preferably an alkalinity source; and v) at least 80%, preferably at least 85% by weight of the composition of water.

Preferred compositions herein include compositions comprising:

i) from about 0.2% to about 2% by weight of a quaternary ammonium compound, preferably a mixture of N-alkyl dimethyl benzyl ammonium chloride, N-octyl decyl dimethyl ammonium chloride, di-n-decyl dimethyl ammonium chloride, and di-n-octyl dimethyl ammonium chloride;

ii) from about 0.10% to about 2% by weight of the composition of the polyimide;

iii) from about 0.05% to about 2% by weight of the composition of a surfactant preferably selected from the group consisting of an amine oxide surfactant, an alcohol alkoxylate non-ionic surfactant, an alkyl polyglucoside surfactant and mixtures thereof, preferably the composition comprises an amine oxide surfactant;

iv) from about 0.2% to about 3% by weight of the composition of an alkalinity source, preferably monoethanolamine; and v) at least 80%, preferably at least 85% by weight of the composition of water.

Preferred compositions herein include compositions comprising:

i) from about 0.2% to about 2% by weight of the quaternary ammonium compound, preferably a mixture of N-alkyl dimethyl benzyl ammonium chloride, N-octyl decyl dimethyl ammonium chloride, di-n-decyl dimethyl ammonium chloride, and di-n-octyl dimethyl ammonium chloride;

ii) from about 0.10% to about 2% by weight of the composition of the polyimide;

iii) from about 0.05% to about 1% by weight of the composition of a non-ionic surfactant, preferably an alcohol ethoxylate;

iv) from about 0.2% to about 3% by weight of the composition of an alkalinity source, preferably an alkanolamine; and v) at least 80%, preferably at least 90% by weight of the composition of water.

Other preferred compositions herein include compositions comprising:

i) from about 0.2% to about 2% by weight of the composition of the quaternary ammonium compound, preferably a mixture of N-alkyl dimethyl benzyl ammonium chloride, N-octyl decyl dimethyl ammonium chloride, di-n-decyl dimethyl ammonium chloride, and di-n-dioctyl dimethyl ammonium chloride;

ii) from about 0.5% to about 1.50% by weight of the composition of the polyimide; and iii) from about 0.25% to 1% by weight of the composition of a surfactant selected from the group consisting of an amine oxide surfactant, a non-ionic surfactant and mixtures thereof, preferably the composition comprises an amine oxide surfactant.

iv) at least 80%, preferably at least 85% by weight of the composition of water.

Preferred compositions herein include compositions comprising:

i) from about 0.25% to about 1% by weight of the composition of the nitrogen containing biocidal compound, preferably a quaternary ammonium compound, preferably a mixture of N-alkyl dimethyl benzyl ammonium chloride, N-octyl decyl dimethyl ammonium chloride, di-n-decyl dimethyl ammonium chloride, and di-n-octyl dimethyl ammonium chloride;

ii) from about 0.10% to about 4% by weight of the composition of the polyimide;

iii) from about 0.25% to about 5% by weight of the composition of a surfactant selected from the group consisting of an amine oxide surfactant, a non-ionic surfactant and mixtures thereof, preferably the composition comprises an amine oxide surfactant.

iv) at least 80%, preferably at least 85% by weight of the composition of water.

Preferably, the compositions of the invention comprise from 0.02% to 0.5% by weight of the composition of perfume.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

EXAMPLES

Example 1

Tables 1 and 2 show cleaning compositions according to the invention (Compositions A to I). Tables 3 to 5 (Compositions J to X) are comparative compositions comprising polymers others than a polyimide polymer. The ingredients are expressed as active weight percentage of the total composition. The compositions according to the invention are all stable. The shine provided by the compositions is graded on black tiles after product application and wiping. Panellists visually assess the streaking appearance of the dried tile according to the following scale; 0=No streaks, 1=Very slight streaks, 2=Slight streaks, 3=Slight to moderate streaks, 4=Moderate streaks, 5=Moderate to heavy streaks, 6=Heavy streaks. All the compositions of the present invention show excellent shine even at the highest polymer level while the comparative compositions leave moderate to heavy streaks on the treated surface.

All compositions were tested for 24 hours residual self-sanitizing using a protocol based on EPA01-1A (24 hr Residual Self-Sanitizing, 12 abrasion cycles) using *Staphylococcus aureus* as the test organism and glass as the test surface, results are provided as log reduction, to pass the EPA01-1A test the composition must provide at least a 3 log reduction. All the compositions of the present invention, including the ones having exemplified provided at least 3 log reduction against *S. aureus* even at levels of the polyimide below 100, none of the comparative polymers tested deliver both residual antimicrobial efficacy and good shine end results.

TABLE 1

| | A | B | C | D | E | F | G |
|---|---|---|---|---|---|---|---|
| n-Alkyl Dimethyl Benzyl Ammonium Chloride | 0.17 | 0.17 | 0.17 | 0.17 | 0.17 | 0.17 | 0.17 |
| Di-n-Octyl Dimethyl Ammonium Chloride | 0.063 | 0.063 | 0.063 | 0.063 | 0.063 | 0.063 | 0.063 |
| n-Octyl Decyl Dimethyl Ammonium Chloride | 0.13 | 0.13 | 0.13 | 0.13 | 0.13 | 0.13 | 0.13 |
| Di-n-Decyl Dimethyl Ammonium Chloride | 0.063 | 0.063 | 0.063 | 0.063 | 0.063 | 0.063 | 0.063 |
| Alkyl dimethyl amine oxide (Genaminox K10) | 0.75 | 0.75 | 0.75 | 0.75 | 0.75 | 0.20 | 0.75 |
| Monoethanolamine | 0.39 | 0.39 | 0.39 | 0.39 | 0.39 | 0.39 | 0.39 |
| Polyimide polymer (Aquaflex XL-30) | 0.3 | 0.4 | 0.5 | 0.6 | 0.75 | 0.90 | 1.0 |
| Fragrance | 0.1 | 0.1 | 0.1 | 0.1 | 0.1 | 0.1 | 0.1 |
| Water | Bal | Bal | Bal | Bal | Bal | Bal | Bal |
| pH | >10 | >10 | >10 | >10 | >10 | >10 | >10 |
| Phase | Single | Single | Single | Single | Single | Single | Single |
| Shine | 1-2 | 1-2 | 1-2 | 1-2 | 1-2 | 1-2 | 1-2 |
| Log Reduction RSS *S. aureus* | 3.02 | 2.85 | 3.41 | 3.51 | 3.03 | 3.20 | 3.49 |

TABLE 2

| | H | I |
|---|---|---|
| n-Alkyl Dimethyl Benzyl Ammonium Chloride | 0.17 | 0.17 |
| Di-n-Octyl Dimethyl Ammonium Chloride | 0.063 | 0.063 |
| n-Octyl Decyl Dimethyl Ammonium Chloride | 0.13 | 0.13 |
| Di-n-Decyl Dimethyl Ammonium Chloride | 0.063 | 0.063 |
| Surfactant C12/C14 Amine oxide(1) | 0.7 | 5 |
| Surfactant C10 EO8 alcohol ethoxylate(2) | | 0.7 |
| Monoethanolamine | 0.39 | 0.39 |
| Polyimide polymer (Aquaflex XL-30) | 0.7 | 0.7 |
| Fragrance | 0.1 | 0.1 |
| Water | Bal | Bal |
| pH | >10 | >10 |
| Phase | Single | Single |
| Shine | 1-2 | 1-2 |
| Log reduction RSS *S.aureus* | 3.20 | 3.15 |

(1)Empigen OB
(2)Neodol 91-8

Examples comprising a polyimide polymer and a quaternary ammonium biocide agent in combination with either an amine oxide surfactant or and alcohol ethoxylate surfactant provide more than log 3 residual antimicrobial efficacy against *S. aureus* and excellent shine.

TABLE 3

| | J | K | M | N | O | P |
|---|---|---|---|---|---|---|
| n-Alkyl Dimethyl Benzyl Ammonium Chloride | 0.17 | 0.17 | 0.17 | 0.17 | 0.17 | 0.17 |
| Di-n-Octyl Dimethyl Ammonium Chloride | 0.063 | 0.063 | 0.063 | 0.063 | 0.063 | 0.063 |
| n-Octyl Decyl Dimethyl Ammonium Chloride | 0.13 | 0.13 | 0.13 | 0.13 | 0.13 | 0.13 |
| Di-n-Decyl Dimethyl Ammonium Chloride | 0.063 | 0.063 | 0.063 | 0.063 | 0.063 | 0.063 |
| Alkyl dimethyl amine oxide (Genaminox K10) | 0.7 | 0.7 | 0.7 | 0.7 | 0.7 | 0.7 |
| Monoethanolamine | 0.39 | 0.39 | 0.39 | 0.39 | 0.39 | 0.39 |
| Polymer (3) | 0.4 | 1.25 | 1.25 | 1.25 | 1.25 | 1.25 |
| Fragrance | 0.1 | 0.1 | 0.1 | 0.1 | 0.1 | 0.1 |
| Water | Bal | Bal | Bal | Bal | Bal | Bal |
| pH | >10 | >10 | >10 | >10 | >10 | >10 |
| Phase | Single | Single | Single | Single | Single | Single |
| Shine | 5-6 | 5-6 | 5-6 | 5-6 | 5-6 | 5-6 |
| Log Reduction RSS *S. aureus* | 2.83 | 2.44 | 2.64 | 3.05 | 3.25 | 3.08 |

(3) Polymers:
Composition J: Polyvinyl pyrrolidone polymer (PVP K-60)
Composition K: Polyvinyl pyrrolidone polymer (PVP K-30)
Composition M: Polyvinyl pyrrolidone polymer (PVP K-15)
Composition N: Polyethyleneimine polymer (Lupasol HF, BASF)
Composition O: Vinylpyrrolidone- dimethylaminopropyl methacrylamide co polymer (Styleze CC-10, Ashland)
Composition P: Polyethyleneglycol methylether polymer

TABLE 4

| | Q | R | S | T | U |
|---|---|---|---|---|---|
| n-Alkyl Dimethyl Benzyl Ammonium Chloride | 0.17 | 0.17 | 0.17 | 0.17 | 0.17 |
| Di-n-Octyl Dimethyl Ammonium Chloride | 0.063 | 0.063 | 0.063 | 0.063 | 0.063 |
| n-Octyl Decyl Dimethyl Ammonium Chloride | 0.13 | 0.13 | 0.13 | 0.13 | 0.13 |
| Di-n-Decyl Dimethyl Ammonium Chloride | 0.063 | 0.063 | 0.063 | 0.063 | 0.063 |
| Alkyl dimethyl amine oxide (Genaminox K10) | 0.7 | 0.7 | 0.7 | 0.7 | 0.7 |
| Monoethanolamine | 0.39 | 0.39 | 0.39 | 0.39 | 0.39 |
| Polymer(4) | 0.4 | 1.25 | 1.25 | 1.25 | 1.25 |
| Fragrance | 0.1 | 0.1 | 0.1 | 0.1 | 0.1 |
| Water | Bal | Bal | Ba | Bal | Bal |
| pH | >10 | >10 | >10 | >10 | >10 |
| Phase | Single | Single | Single | Single | Single |
| Shine | 5-6 | 5-6 | 5-6 | 5-6 | 5-6 |
| Log Reduction RSS *S. aureus* | 2.98 | 3.13 | 2.83 | 3.01 | 2.91 |

(4)Polymer:
Composition Q: Low Molecular Weight polyoxazoline polymer
Composition R: Vinylpyrrolidone-Dimethylaminoethylmethacrylate Copolymer (Copolymer 845-O Ashland)
Composition S: Polyvinylpyrrolidone-vinyl acetate copolymer (PVP-VA I535)
Composition T: Vinylpyrrolidone-methacrylamide-vinylimidazole copolymer (Luviquat Supreme AT1 BASF)
Composition U: Vinylpyrrolidone copolymer (Surfaguard DV5)

TABLE 5

| | V | W | X |
|---|---|---|---|
| n-Alkyl Dimethyl Benzyl Ammonium Chloride | 0.17 | 0.17 | 0.17 |
| Di-n-Octyl Dimethyl Ammonium Chloride | 0.063 | 0.063 | 0.063 |
| n-Octyl Decyl Dimethyl Ammonium Chloride | 0.13 | 0.13 | 0.13 |
| Di-n-Decyl Dimethyl Ammonium Chloride | 0.063 | 0.063 | 0.063 |

TABLE 5-continued

| | V | W | X |
|---|---|---|---|
| Alkyl dimethyl amine oxide (Genaminox K10) | 0.7 | 0.7 | 0.7 |
| Monoethanolamine | 0.39 | 0.39 | 0.39 |
| Polymer-Polyquaternium 81 (5) | 1.25 | 0.75 | 0.4 |
| Fragrance | 0.1 | 0.1 | 0.1 |
| Water | Bal | Bal | Bal |
| pH | >10 | >10 | >10 |
| Phase | Single | Single | Single |
| Shine | 5-6 | 5-6 | 5-6 |
| Log Reduction RSS *S. aureus* | 3.33 | 2.48 | 2.21 |

(5) Polysugaquat S1210P Colonial

Example 2

Table 6 shows a comparation between a composition according to the invention (composition Y) with a composition comprising a polyquart polymer (composition Z). The ingredients are expressed as active weight percentage of the total composition. The composition according to the invention is stable. The shine provided by the compositions is graded on black tiles after product application and wiping. Panelists visually assess the streaking appearance of the dried tile according to the following scale; 0=No streaks, 1=Very slight streaks, 2=Slight streaks, 3=Slight to moderate streaks, 4=Moderate streaks, 5=Moderate to heavy streaks, 6=Heavy streaks. In this instance, the shine was analyzed 24 hours post product application. The composition of the present invention (composition Y) shows excellent shine whilst the comparative composition with the polyquart polymer (composition Z) left heavy streaks on the treated surface.

The compositions were tested for 24 hours residual self-sanitizing using a protocol based on EPA01-1A (24 hr Residual Self-Sanitizing, 12 abrasion cycles) using *Klebsiella aerogenes* as the test organism and glass as the test surface, results are provided as log reduction, to pass the EPA01-1A test the composition must provide at least a 3 log reduction. The two compositions provided the 3 log reduction, however the polyquart did not deliver the good shine as observed with the polyimide polymer.

TABLE 6

| | Y | Z |
|---|---|---|
| n-Alkyl Dimethyl Benzyl Ammonium Chloride | 0.17 | 0.17 |
| Di-n-Octyl Dimethyl Ammonium Chloride | 0.063 | 0.063 |
| n-Octyl Decyl Dimethyl Ammonium Chloride | 0.13 | 0.13 |
| Di-n-Decyl Dimethyl Ammonium Chloride | 0.063 | 0.063 |
| Alkyl dimethyl amine oxide (Genaminox K10) | 0.7 | 0.7 |
| Monoethanolamine | 0.39 | 0.39 |
| Polymer | 0.75 | 0.75 |
| Fragrance | 0.1 | 0.1 |
| Water | Bal | Bal |
| pH | >10 | >10 |
| Phase | Single | Single |
| Shine | 1-2 | 5-6 |
| Log Reduction RSS *K. aerogenes* | 3.13 | 3.03 |

Y = Polyimide polymer. Aquaflex XL-30
Z = Polyquart Pro A polymer (BASF)

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An aqueous antimicrobial cleaning composition comprising:

i) from 0.02% to 2.50% by weight of the composition of a biocidal agent, wherein said biocidal agent comprises a quaternary ammonium biocidal compound and wherein the quaternary ammonium biocidal compound is a mixture comprising: from about 30% to about 50%, by weight of the mixture of N-alkyl dimethyl benzyl ammonium chloride, from about 20% to about 40% by weight of the mixture of N-octyl decyl dimethyl ammonium chloride, from about 5% to about 25% by weight of the mixture of di-n-decyl dimethyl ammonium chloride, and about 5% to about 25% by weight of the mixture of di-n-octyl dimethyl ammonium chloride; and ii) from about 0.1 to about 2% by weight of the composition a polyimide;

wherein the polyimide comprises at least one structural unit (A1), at least one structural unit (A2), at least one structural unit (A3), and optionally one additional structural unit (A4)

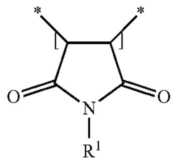

(A1)

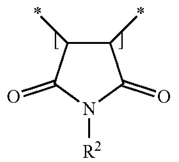

(A2)

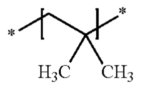

(A3)

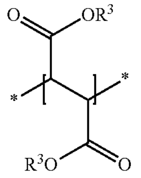

(A4)

wherein $R^1$ stands for an optionally heterofunctionalized alkyl radical;

$R^2$ stands for an optionally heterofunctionalized alkyl radical other than $R^1$; and $R^3$, independently of one another, stands for H, or an optionally heterofunctionalized alkyl radical other than $R^1$ and $R^2$.

2. The composition according to claim 1 wherein the polyimide comprises at least one structural unit (A1), at least one structural unit (A2), at least one structural unit (A3), and optionally at least one structural unit (A4) wherein:

$R^1$ stands for a radical $—CH(CH_3)CH_2—(OCH(CH_3)CH_2)_x—(OCH_2CH_2)_y—O—CH_3$, in which x and y, independently of one another, have a value between 1 and about 100 and/or, $R^2$ stands for a radical containing an amino group, and/or $R^3$ stands for H or an alkyl radical.

3. The composition according to claim 1 wherein the polyimide comprises at least about 70% by weight of the structural units (A1), (A2), (A3) and (A4).

4. The composition according to claim 1 wherein the polyimide comprises at least about 90% by weight of the structural units (A1), (A2), (A3) and (A4).

5. The composition according to claim 1 wherein the polyimide is substantially free of structural units other than (A1), (A2), (A3) and (A4).

6. The composition according to claim 1 wherein the polyimide comprises at least one structural unit (A1), at least one structural unit (A2), and at least one structural unit (A3)

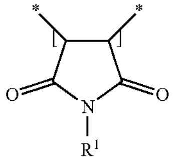

(A1)

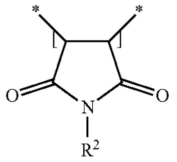

(A2)

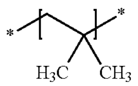

(A3)

wherein $R^1$ stands for an alkyl radical, and $R^2$ stands for a heterofunctionalized alkyl radical.

7. The composition according to claim 1 wherein the biocidal agent comprises from about 0.1% to about 2% by weight of the composition of the quaternary ammonium biocidal compound.

8. The composition according to claim 1 wherein the biocidal agent further comprises a tertiary amine compound selected from the group of N,N-Bis(3-aminopropyl)alkylamine, N-alkyldiethanolamine, and mixtures thereof.

9. The composition according to claim 1 further comprising a surfactant selected from the group consisting of an amine oxide surfactant, a non-ionic alcohol alkoxylate surfactant, an alkyl polyglucoside surfactant and mixtures thereof.

10. The composition according to claim 1 further comprising a surfactant wherein the surfactant comprises an amine oxide surfactant.

11. The composition according to claim 1 further comprising a surfactant wherein the surfactant comprises a non-ionic surfactant comprising an alcohol alkoxylate.

12. The composition according to claim 1 further comprising a surfactant wherein the surfactant comprises a non-ionic surfactant comprising an alkyl polyglucoside surfactant.

13. The composition according to claim 1 wherein the composition has a pH of 6 or above as measured at 20° C.

14. The composition according to claim 1 comprising:

i) from about 0.05% to about 2.5% by weight of the composition of the biocidal agent;

ii) from about 0.2% to about 1.5% by weight of the composition of the polyimide;

iii) from about 0.05% to about 5% by weight of the composition of a surfactant;

iv) from about 0% to about 3% by weight of the composition of a pH adjusting agent; and v) at least about 80% by weight of the composition of water.

15. A method to provide at least 99.9% microbial reduction to an inanimate surface for at least 24 hours as measured using the EPA-approved 24 hours residual self-sanitizing test method (EPA #01-1A) comprising the step of treating the surface with a composition according to claim 1.

* * * * *